United States Patent Office 2,836,502
Patented May 27, 1958

---

2,836,502

TILE GROUT

Julius John Bartoli and John Antonio Bartoli, Dallas, Tex.

No Drawing. Application November 6, 1956
Serial No. 620,577

1 Claim. (Cl. 106—98)

The instant invention relates to tile grouts and more particularly to such a grout that may be packaged complete with all additives at the plant where made; which can be shipped or stored without deterioration due to absorption of excess moisture; which is ready for use by the tile setter on the job, only with the addition of an ordinary amount of water, followed by mixing and application directly to the tile joints.

Heretofore in conventional grouts used with ceramic tiles and glazed brick tile, the tiles being dry absorb moisture from the grouts causing the latter to pulverize in the joints. The grout comes in contact with the sides and bottom of the tile.

The grout of the instant invention sets hard in the tile joints and is applied to a dry tile that has not been soaked or wetted. It absorbs no more moisture from the air or deteriorates any faster than conventional Portland cement.

Tile grouts contain various ingredients among which may be mentioned one or more selected from marble dust, crushed limestone, white refined powdered clay, white powdered lime, etc. This makes up approximately 30 to 50% of the grout. To this is added approximately 1 to 5% of a whitening agent selected from titanium oxide, lithopone, zinc oxide, magnesium oxide, barium sulphate, calcium oxide and the like. Also, there is added 40% to 60% of white Portland cement.

The present invention contemplates the addition of 1% to 5% of barium chloride to a grout composition containing the selected ingredients set out in the preceding paragraph. It has been found that the barium chloride is the one additive that can be used in premixing and packaging at the plant without the additive absorbing moisture within the package and ruining the grout. It sets hard in the joint; needs no additive other than water when mixing for use; thus it may be applied directly to a dry tile that has not been soaked or wetted.

Accordingly, it will be seen that the grout composition herein described including a setting agent and hardener may be used on glazed structural brick tile units or other tiles where fast drying or pulverizing of the grout in a joint presents a problem.

Various changes may be made in the specific disclosure as will be apparent to those skilled in the art and it is contemplated to cover all such and to be limited in this respect only as may be necessary by the scope of the claim hereto appended.

What we claim and desire to secure by Letters Patent is:

A tile grout consisting essentially of the following ingredients in approximately the proportions indicated:

|  | Percent |
|---|---|
| A member chosen from the group consisting of silica, clay or limestone | 30 to 50 |
| A member chosen from the group consisting of titanium oxide, lithopone, zinc, magnesium oxide, barium sulphate and calcium oxide | 1 to 5 |
| Portland cement | 40 to 60 |
| Barium chloride | 1 to 5 |

References Cited in the file of this patent

UNITED STATES PATENTS

| 611,200 | Hobson | Sept. 20, 1898 |
| 928,061 | Mitats | June 13, 1909 |
| 1,077,689 | Ellis | Nov. 4, 1913 |
| 1,793,143 | Toch | Feb. 17, 1931 |

OTHER REFERENCES

Pages 109, 113 and 117 of "Rock Products," October 1954, articles by Wallace C. Riddle entitled "Calcined Gypsum."